US008489735B2

(12) United States Patent
Befort

(10) Patent No.: US 8,489,735 B2
(45) Date of Patent: Jul. 16, 2013

(54) CENTRAL CROSS-SYSTEM PI MONITORING DASHBOARD

(75) Inventor: Waldemar Befort, Hockenheim (DE)

(73) Assignee: SAP AG, Walldorf (DE)

(*) Notice: Subject to any disclaimer, the term of this patent is extended or adjusted under 35 U.S.C. 154(b) by 201 days.

(21) Appl. No.: 12/872,936

(22) Filed: Aug. 31, 2010

(65) Prior Publication Data
US 2012/0054334 A1 Mar. 1, 2012

(51) Int. Cl.
*G06F 15/173* (2006.01)
(52) U.S. Cl.
USPC .................. 709/224; 709/225; 709/226
(58) Field of Classification Search
None
See application file for complete search history.

(56) References Cited

U.S. PATENT DOCUMENTS

| | | | | |
|---|---|---|---|---|
| 5,845,062 A * | 12/1998 | Branton et al. | ................. | 714/25 |
| 5,913,036 A * | 6/1999 | Brownmiller et al. | ........ | 709/224 |
| 5,974,237 A * | 10/1999 | Shurmer et al. | ............. | 709/224 |
| 7,143,161 B2 * | 11/2006 | Brissette | ...................... | 709/224 |
| 7,216,162 B2 * | 5/2007 | Amit et al. | ..................... | 709/224 |
| 7,313,324 B1 * | 12/2007 | Eslambolchi et al. | .......... | 398/17 |
| 7,453,815 B1 * | 11/2008 | Grabelsky et al. | ............ | 370/241 |
| 7,478,151 B1 * | 1/2009 | Maiocco et al. | ............. | 709/223 |
| 7,804,787 B2 * | 9/2010 | Brandyburg et al. | ......... | 370/252 |
| 7,853,472 B2 * | 12/2010 | Al-Abdulqader et al. | ... | 705/7.13 |
| 8,255,525 B2 * | 8/2012 | Martin et al. | ................. | 709/224 |
| 8,271,633 B2 * | 9/2012 | Pyrik et al. | ..................... | 709/223 |
| 2006/0085376 A1 * | 4/2006 | Hoerle et al. | ..................... | 707/1 |
| 2006/0126801 A1 | 6/2006 | Laperi et al. | | |
| 2006/0212445 A1 * | 9/2006 | Rydahl et al. | ..................... | 707/5 |
| 2006/0233311 A1 * | 10/2006 | Adams et al. | .................... | 379/21 |
| 2006/0253566 A1 * | 11/2006 | Stassinopoulos et al. | ..... | 709/224 |
| 2006/0265418 A1 * | 11/2006 | Dolezal et al. | ................ | 707/102 |
| 2007/0011317 A1 * | 1/2007 | Brandyburg et al. | ......... | 709/224 |
| 2007/0066297 A1 * | 3/2007 | Heidari-Bateni | ............. | 455/423 |
| 2007/0234426 A1 * | 10/2007 | Khanolkar et al. | ............ | 726/23 |
| 2007/0240061 A1 * | 10/2007 | Cormode et al. | ............ | 715/736 |
| 2009/0182825 A1 * | 7/2009 | Fletcher | ........................ | 709/206 |
| 2010/0083145 A1 * | 4/2010 | Schang et al. | ................ | 715/760 |

FOREIGN PATENT DOCUMENTS

EP 1475734 A2 11/2004
WO 2009/134945 A2 11/2009

OTHER PUBLICATIONS

Extended European Search Report, dated Dec. 27, 2011, from corresponding European Patent Application No. 11006927.5.

* cited by examiner

*Primary Examiner* — Ninos Donabed
(74) *Attorney, Agent, or Firm* — Kenyon & Kenyon LLP

(57) ABSTRACT

Embodiments of the present invention may provide a cross system monitor. The cross system monitor may function as a central dashboard for all PI components in PI domains being monitored. The cross system monitor may tightly integrate PI monitoring with system monitoring. Further, the cross system monitor may provide integration with incident management, notification management and alerting infrastructure. Moreover, the cross system monitor may provide context specific guidance with analysis. In addition, the cross system monitor may collect all necessary information regularly and automatically in background.

9 Claims, 14 Drawing Sheets

CENTRAL CROSS-SYSTEM PI MONITORING DASHBOARD

FIELD

The disclosed subject matter relates to the field of computer systems and, more particularly, to a method and apparatus for providing a central cross system monitor.

BACKGROUND

Modern enterprises typically use a lot of software systems. In most current system landscapes, many components are directly connected in a point-to-point connection. To facilitate communications, interfaces are developed between two systems so that a sender system can send a document to a receiver system via an interface. Those interfaces typically are hardwired into the application components and individual mappings programs. Because interfaces are between any two systems, the growth of the number of computer systems results in a complicated network of connections. Under these conditions, managing the collaborative sharing of information is difficult. Therefore, companies face an increasing need for integration of and collaboration among their information and enterprise software systems.

A message exchange framework based on SOAP/XML technology provides a platform that allows different interfaces to communicate using a uniform technology and promotes overall clarity and reduces maintenance effort. However, customers keep complaining about high total cost of ownership in operations of an exchange framework product, such as SAP Netweaver Process Integration (PI).

Regular monitoring activities in the existing PI product are extremely expensive in terms of man-power, effort and time-consumption. An SAP Netweaver PI system typically consists for several technical components which all offer local monitoring applications. The longer SAP customers use SAP PI the more complex their PI landscape gets. Big customers typically have hundreds of SAP PI components which makes it almost impossible to operate and monitor each single component individually. Accordingly, a need exists for a method and system for a central monitor that provides a monitoring capability across the PI system.

BRIEF DESCRIPTION OF THE DRAWINGS

FIG. 7 illustrates an exemplary user interface of a cross system monitor for a component monitor according to an exemplary embodiment.

FIG. 12 illustrates an exemplary user interface of a cross system monitor for a message error monitor according to an exemplary embodiment.

FIG. 14 illustrates an exemplary user interface of a cross system monitor for a message flow monitor according to an exemplary embodiment.

DETAILED DESCRIPTION

Embodiments of the present invention may provide a cross system monitor. The cross system monitor may function as a central dashboard for all PI components in PI domains being monitored. The cross system monitor may tightly integrate PI monitoring with system monitoring. Further, the cross system monitor may provide integration with incident management, notification management and alerting infrastructure. Moreover, the cross system monitor may provide context specific guidance with analysis. In addition, the cross system monitor may collect all necessary information regularly and automatically in background.

Figure 1:
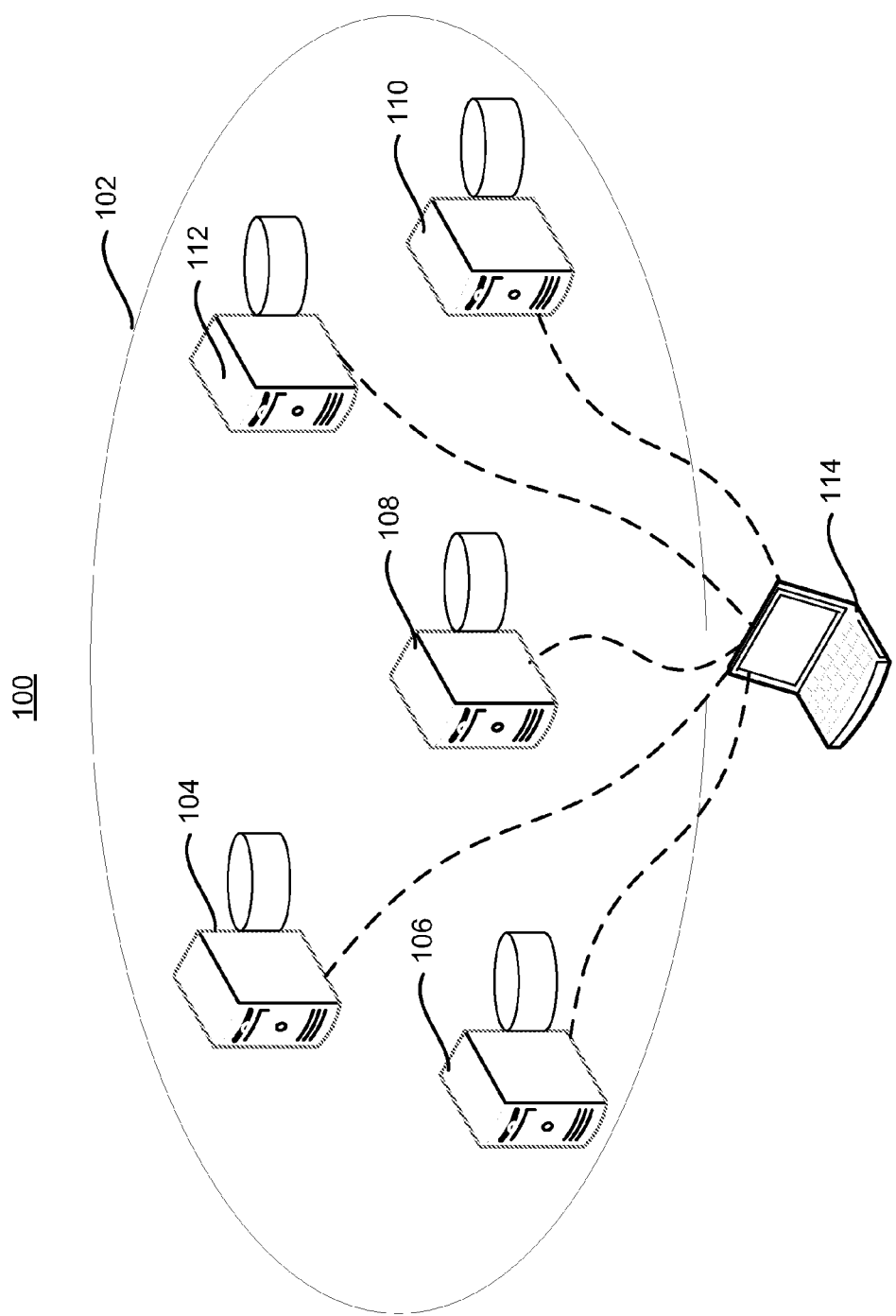
FIG. 1 illustrates an exemplary system according to an embodiment.

FIG. 1 illustrates an exemplary system 100 according to an embodiment. The system 100 may comprise a process integration (PI) domain 102 and a cross system monitor 114. The PI domain 102 may comprise a variety of PI components, such as, a business system 104, a proxy 106 and adapter engines 110 and 112. The business system 104 may be a backend system that represents any of a number of processes or services and their software and hardware, such as Web portals, buying or selling programs, electronic mail, business management programs, project planning programs, etc. Some backend systems (not shown) in the PI domain 102 may be Web-based applications programmed according to standard computing platforms using web-specific programming languages such as Java and ABAP, for instance. These backend systems may be integrated into the PI domain 102 by the proxy 106 (e.g., an ABAP proxy), or adapters (e.g., Java adapters) hosted in the adapter engines 110 and 112.

Proxies and adapters make the communication technology stack transparent to backend systems, and present a backend system with a programming language-dependent interface. The communication logic may be implemented within the proxy and adapter that represents the interface description of the respective development platform, such as Java, ABAP, and .NET for a web-based application. The proxies and adapters may convert platform-specific data types into XML and provide access to the component-specific local integration engine. In one embodiment, the proxies and adapters may be deployed on any machines (e.g., a physical machine or a virtual instance that also host one or more backend systems) and are not necessarily on stand aloe machines.

The PI components may communicate with each other by message based interaction. Some backend systems, such as the business system 104, may send PI messages (e.g., SOAP messages) directly. Others backend systems may need translators, such as adapters or proxies (e.g., the proxy 106, or adapters for different protocols hosted by the adapter engines 110 and 112), to translate messages from different systems into PI messages. Thus, the proxy 106 and adapter engines 110 and 112 may be used as bridges to exchange messages in the PI domain 102.

The cross system monitor 114 may be a central dashboard running on a computing device as shown in FIG. 1. The computing device may have a memory to store computer instructions and a computer processor coupled to the memory to execute the computer instructions to monitor one or more PI domains. That is, in addition to the PI domain 102, the cross system monitor 114 may be connected to multiple PI domains and used to monitor multiple PI domains simultaneously. The monitoring may include all components of each of the PI domain being monitored. Each component being monitored may push diagnostic information, such as, but not limited to, availability and self-test information, to the cross system monitor 114. Further, each component may have databases storing message flow data and the cross system monitor 114 may actively read and aggregate message flow data from each component being monitored to generate a component-independent view.

Figure 2:
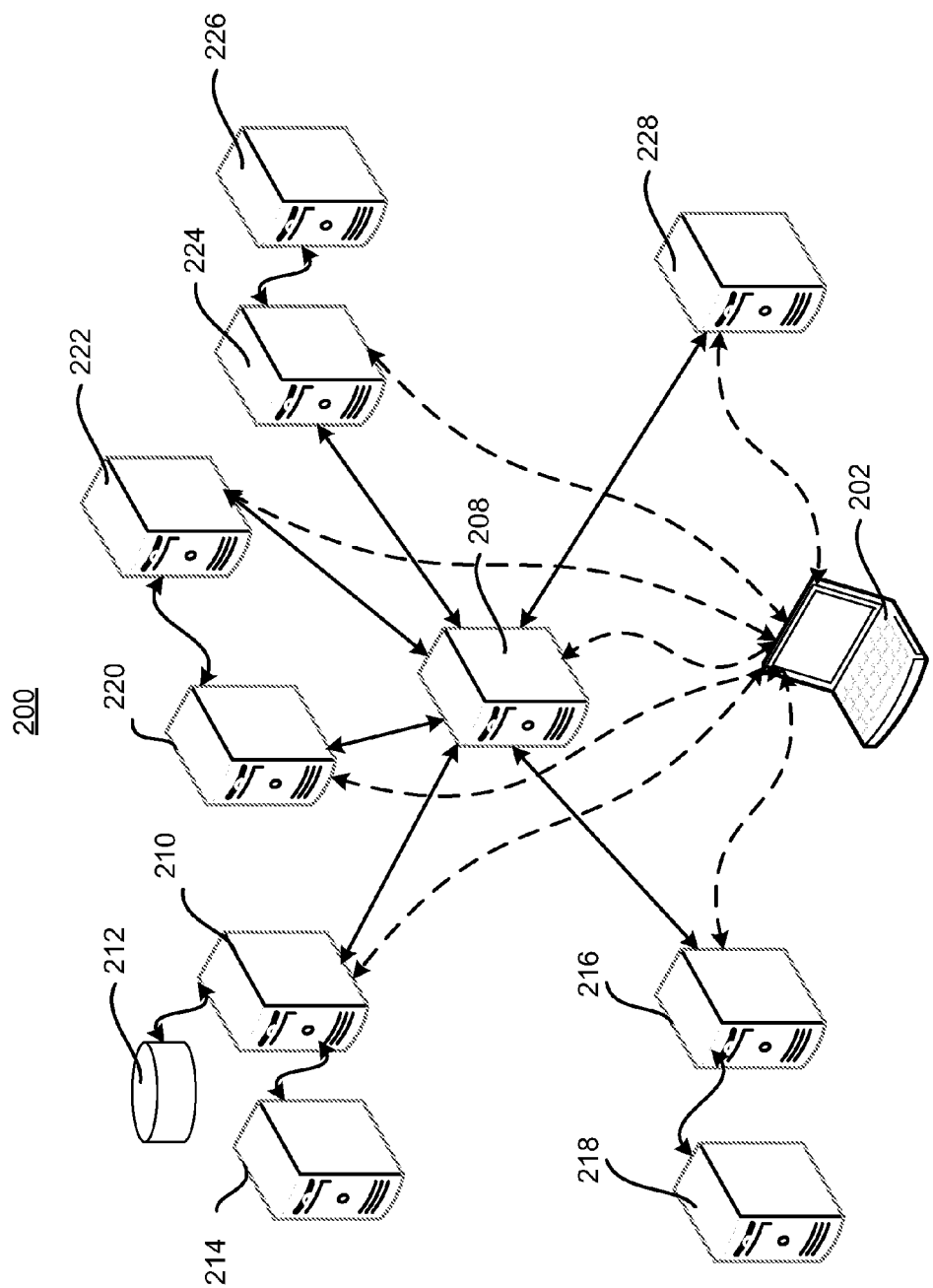
FIG. 2 illustrates an exemplary system for an integrated, message-based infrastructure according to an embodiment.

FIG. 2 illustrates an exemplary system 200 for an integrated, message-based infrastructure according to an embodiment. The system 200 may comprise a variety of backend systems connected by an integration server 208. The variety of backend systems may include a JDBC database 212, a SOAP backend system 214, a JMS system 218, an IDoc backend system 222, a file system 226. The system 200 may further comprise proxies 220 and 228, and adapter engines 210, 216 and 224. In one embodiment, the integration server 208 may also comprise an adapter engine (shown in FIG. 3). To distinguish the adapter engines 210, 216 and 224 from the adapter engine of the integration server 208, the adapter engines 210, 216 and 224 may be referred to as decentral adapter engines and the adapter engine of the integration server 208 may be referred to as a central adapter engine.

As shown in FIG. 2, the JDBC database 212 and SOAP backend system 214 may be connected to the integration server 208 by the adapter engine 210, which may host respective adapters for the JDBC database 212 and SOAP backend system 214. The JMS system 218 may be connected to the integration server 208 by the adapter engine 216. The file system 226 may be connected to the integration server 208 by the adapter engine 224. The IDoc backend system 222 may be connected to the integration server 208 directly and indirectly via the proxy 220. In one embodiment, the proxy 220 may be hosted in a separate machine. Alternatively, the proxy software may be installed on the same machine as the IDoc backend system 222.

In the system 200, the communication between different PI components may be message based. In one embodiment, any PI components directly connected to the integration server 208 may communicate with the integration server 208 in PI messages, such as the communication between any of the adapter engines, proxies and integration server 208. On the other hand, communication between an end system and its proxy or adapter may be in non-PI messages (e.g., a point-to-point proprietary message).

In one embodiment, the message based communication may be implemented by communication channels. Each communication channel may be an entity that acts as some kind of connection. It may be customized and may know what to read at a certain time and what to do after the read. For example: a file channel may know where to poll files at what times and how to translate the retrieved files and where to send them. The communication channels may be implemented in adapters (e.g., a file adapter for file channel) and run on any adapter engine (e.g., cross system monitor 114 and adapter engines 210, 216 and 224). The PI domain 102 may comprise a business system 104, a proxy 106 and adapter engines 110 and 112. The PI domain 102 may be a message based exchange infrastructure that interconnects a variety of components, such as the business system 104, the proxy 106 and adapter engines 110 and 112. The proxy 106 and adapter engines 110 and 112 may be used by other systems (not shown) as bridges to exchange messages with other systems in the PI domain 102.

The cross system monitor 202 may be a central dashboard similar to the cross system monitor 114. The monitoring may include all components of each of the PI domain being monitored. Each component being monitored may push availability and self-test information to the cross system monitor 202. Further, the cross system monitor 202 may actively read and aggregate message flow data from each component being monitored to generate a component-independent view. The monitored data flow may be referred to as PI-related data flow. The PI related data flow may include, for example, a file adapter reading a .txt-file via a communication channel, or a file containing several entries that each can result in different PI messages (XI SOAP format).

In addition to monitoring data collection for PI related data, the cross system monitor 202 may also monitor data collection for other systems (e.g., IDoc backend system 222), which may end up in the system monitoring application and may be integrated with PI Monitoring application.

Figure 3:
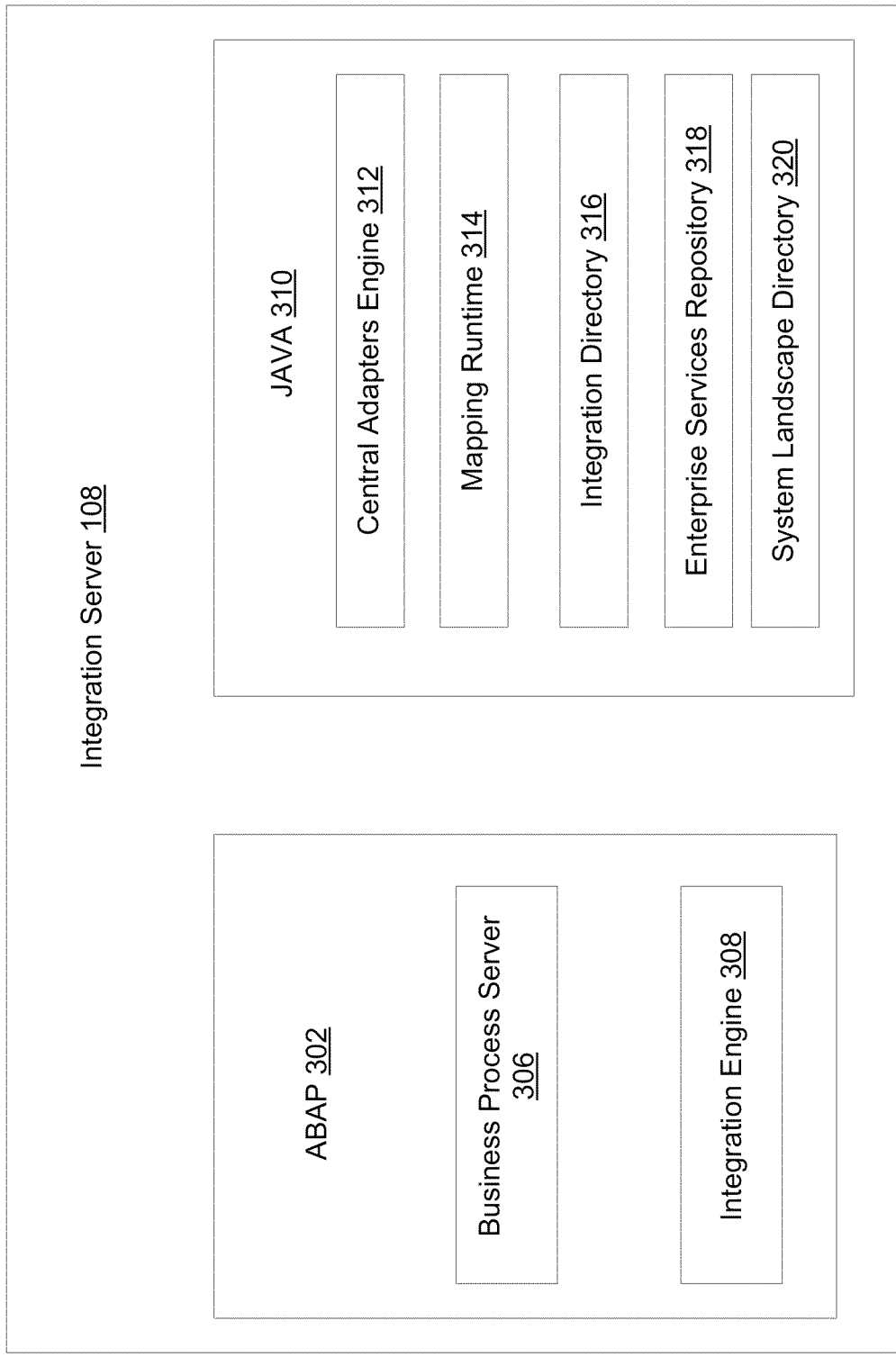
FIG. 3 illustrates an exemplary integration server according to an embodiment.

FIG. 3 illustrates an exemplary integration server 300 according to an embodiment. The integration server 300 include components implemented in different programming languages. For example, the integration server 300 include an ABAP stack 302 and a JAVA stack 310. The ABAP stack 302 may include a business process server 306 and an integration engine 308. The JAVA stack 310 may include a central adapters engine 312, a mapping runtime 314, an integration directory 316, an enterprise services repository 318 and a system landscape directory 320. In at least one embodiment, the exemplary integration server 300 may be used as the integration server 108 and 208 shown in FIGS. 1 and 2.

The business process server 306 may execute centrally modeled business processes. The integration engine 308 may provide messaging and business process control at runtime for connecting services and managing the process flow. The central adapters engine 312 may include various adapters to provide connectivity between the integration server 300 and a variety of software applications (e.g., backend systems). The mapping runtime 314 may define required transformations between different message interfaces, message types, or data types in different PI messages.

The enterprise services repository 318 may capture design-time collaboration descriptions of all software components that can communicate via the integration server 300. The integration directory 316 may capture configuration-specific collaboration descriptions of the integration server at runtime, which includes accessing actual component installations from the system landscape directory 320 and connectivity descriptions for backend systems, all of which represents the shared business semantics of a PI domain containing the integration server 300. The integration server 300 may uses the shared business semantics at runtime to execute message-based collaboration among the active software components.

Figure 4:
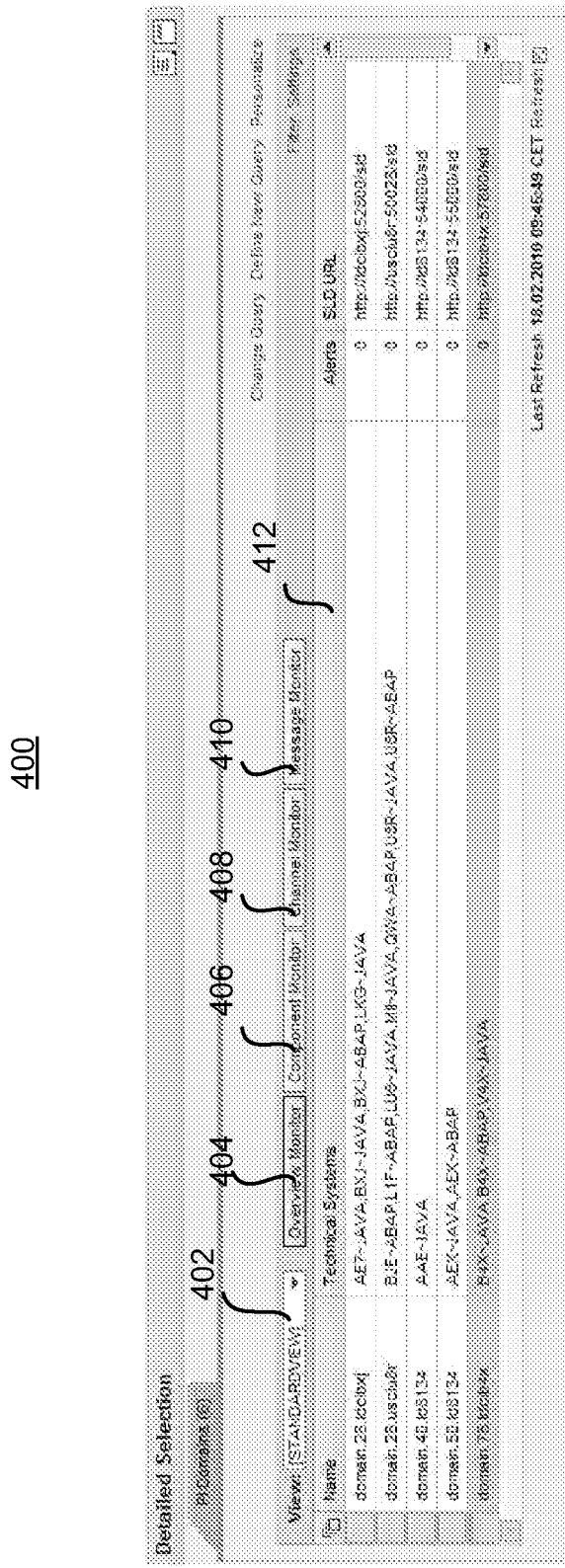
FIG. 4 illustrates an exemplary user interface of a cross system monitor for an overview of a process integration domain according to an embodiment.

FIG. 4 illustrates an exemplary user interface 400 of a cross system monitor for an overview of a process integration domain according to an embodiment. The user interface 400 of the cross system monitor may include a drop down box 402 to select different views (e.g., a standard list view, a detailed view, a thumb view) and a list 412 of PI domains being monitored. The user interface 400 of the cross system monitor may also provide a plurality of buttons to launch different PI monitoring applications: overview monitor 404, component monitor 406, channel monitor 408 and message monitor 410. In one embodiment, a specific PI domain from the list 412 of PI domains may be selected and a PI monitoring application may be launched by clicking one of the buttons for the PI monitoring applications. The cross system monitor may be referred also as cross PI component monitor. It may provide an integrated central PI product monitor with the system monitoring in one "overview monitor," which is different from any prior art monitoring tools that are either standalone or only mixes up contents for different components to be monitored.

Figure 5:
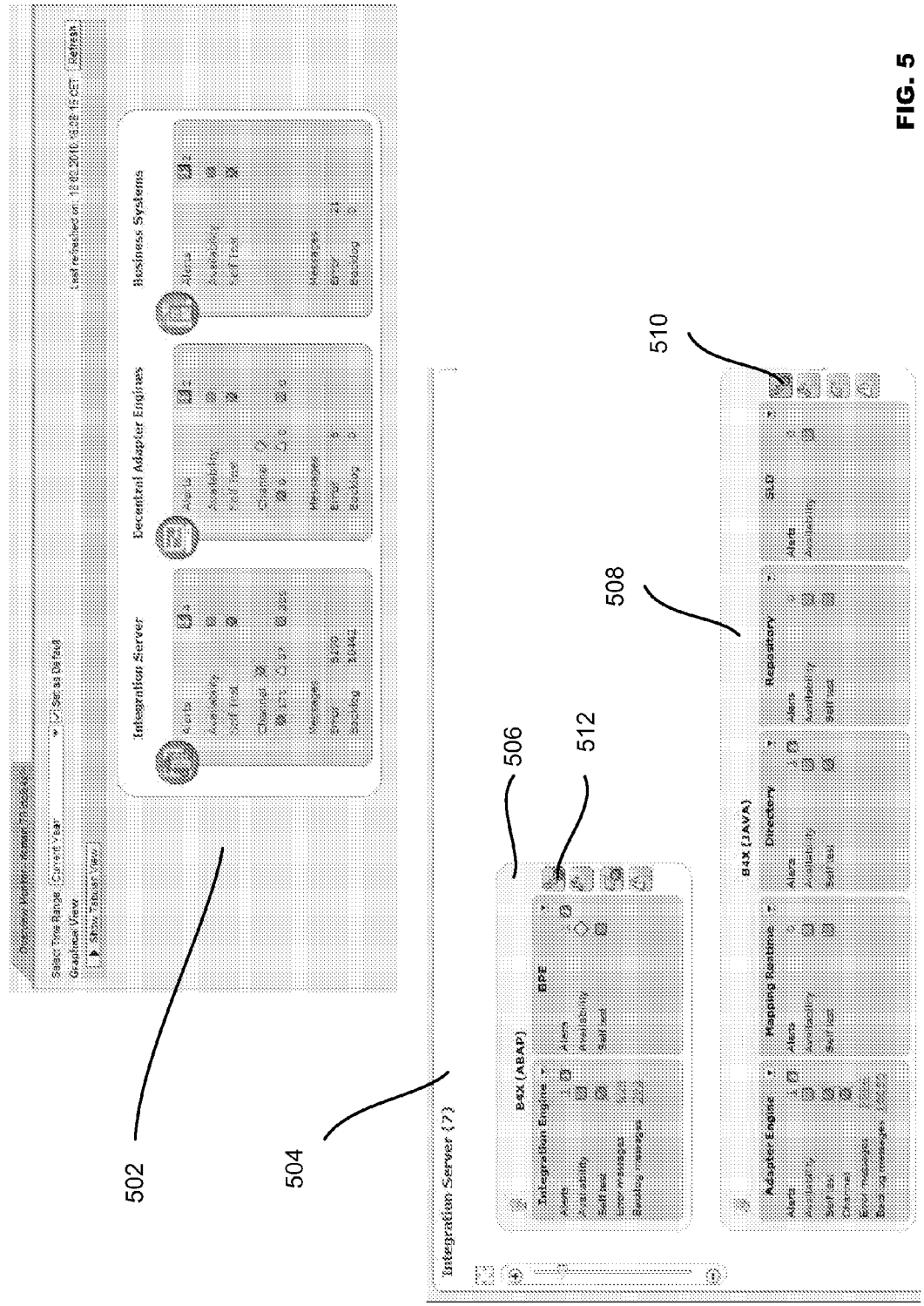
FIG. 5 illustrates an exemplary user interface of a cross system monitor for an overview monitor according to an exemplary embodiment.

FIG. 5 illustrates an exemplary user interface 500 of a cross system monitor for an overview monitor according to an exemplary embodiment. FIG. 5 may be launched when the button for overview monitor 404 of FIG. 4 is clicked. The user interface 500 of the cross system monitor may display an aggregated view 502 for each component type (e.g., integration server, decentral adapter engines and business systems) and a detailed view 504 for individual view per PI component. The aggregated view 502 may show important information for each PI component, for example, number of alerts, availability, self test result, conditions of communication channels, error messages and backlog messages. The detailed view 504 may display details of a PI component. For example, for an integration server, the detailed view 504 may display the components of the ABAP stack (e.g., integration engine, business process engine) in a panel 506 and the JAVA stack (e.g., central adapter engine, mapping runtime, integration directory, integration repository and system landscape directory) in a panel 508. The aggregated view 502 may be used as an entry point with most important status information on Integration Server, Decentral Adapter Engines and connected backend business systems.

The user interface 500 may provide a drill down capability such that each individual component or a subcomponent may be clicked to show further detail. For example, clicking on the integration server in the aggregated view 502 may show the detailed view 504 of the integration server. Clicking on any of the information icons for a PI component, for example, self-test icon for the integration engine, may show more detailed information about that particular PI component. Self-Test for each PI component may enable an user (e.g., a supporter, admin, or integration expert) to see what's going on with the PI component.

In the example shown in FIG. 5, B4Y may be a technical system that in this case may consist of two stacks—one is the ABAP stack (B4Y~ABAP), the other is the JAVA stack (B4Y~JAVA). The PI domain may be referred to as B4Y because an Integration Server is running on the B4Y Technical system. It should be noted that the PI domain may contain components (decentral Adapter Engines) from other technical systems as well.

Figure 6:
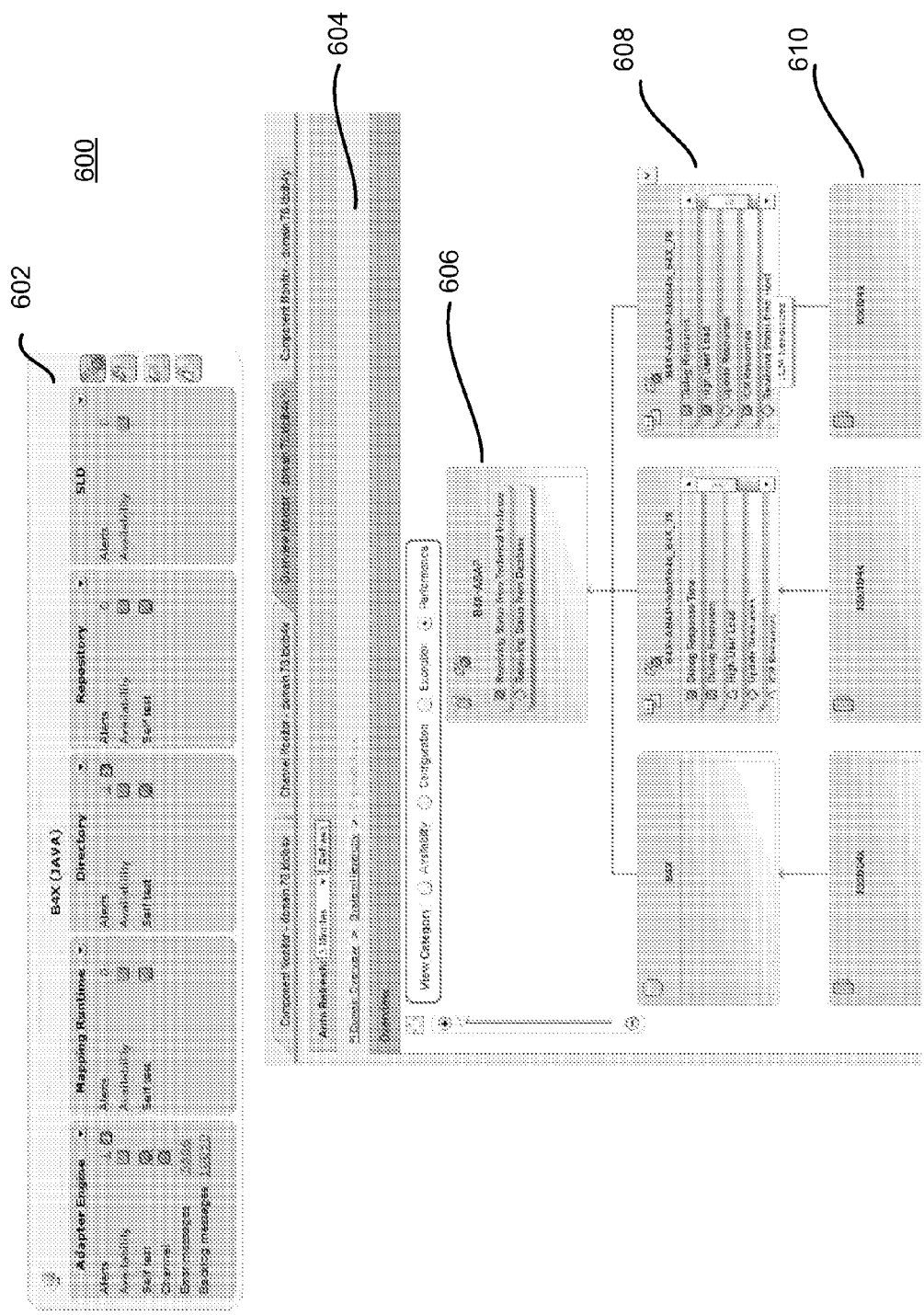
FIG. 6 illustrates an exemplary user interface of a cross system monitor for an overview monitor with system monitoring according to an exemplary embodiment.

The overview monitor of FIG. 5 may also provide an integration with system monitoring on level of technical system. For example, a button 510 (or 512) may be provided for PI components of the JAVA stack or ABAP stack. If either 510 or 512 is clicked, FIG. 6 is shown. FIG. 6 illustrates an exemplary user interface 600 of a cross system monitor for an overview monitor with system monitoring according to an exemplary embodiment. The screen display of user interface 600 may comprise a display 602 of the B4Y~JAVA and a system hierarchy 604. The system hierarchy 604 may comprise hosts 610 at the bottom, instances 608 in the middle and a system 606 at the top. Each host 610 may be a technical box, such as a personal computer. Each instance may be a logical entity like a server node in JAVA. The system may be an artificial entity for metrics that are not specific for an instance or host but relevant for the entire system.

The system hierarchy may show a view category selected from: availability, configuration, exception, and performance. For example, clicking on the icon for technical system "PERFORMANCE" may navigate to System Monitoring where all monitoring metrics that are active for category "PERFORMANCE" may be displayed. One example for these metrics may be Number of Internet Communication Manager (ICM) requests in Queue, which may show whether the ICM is overloaded and therefore the performance of the instance may not be well. Further, the display may help analyze how this value behaved in the last 24 hours)

Figure 7:
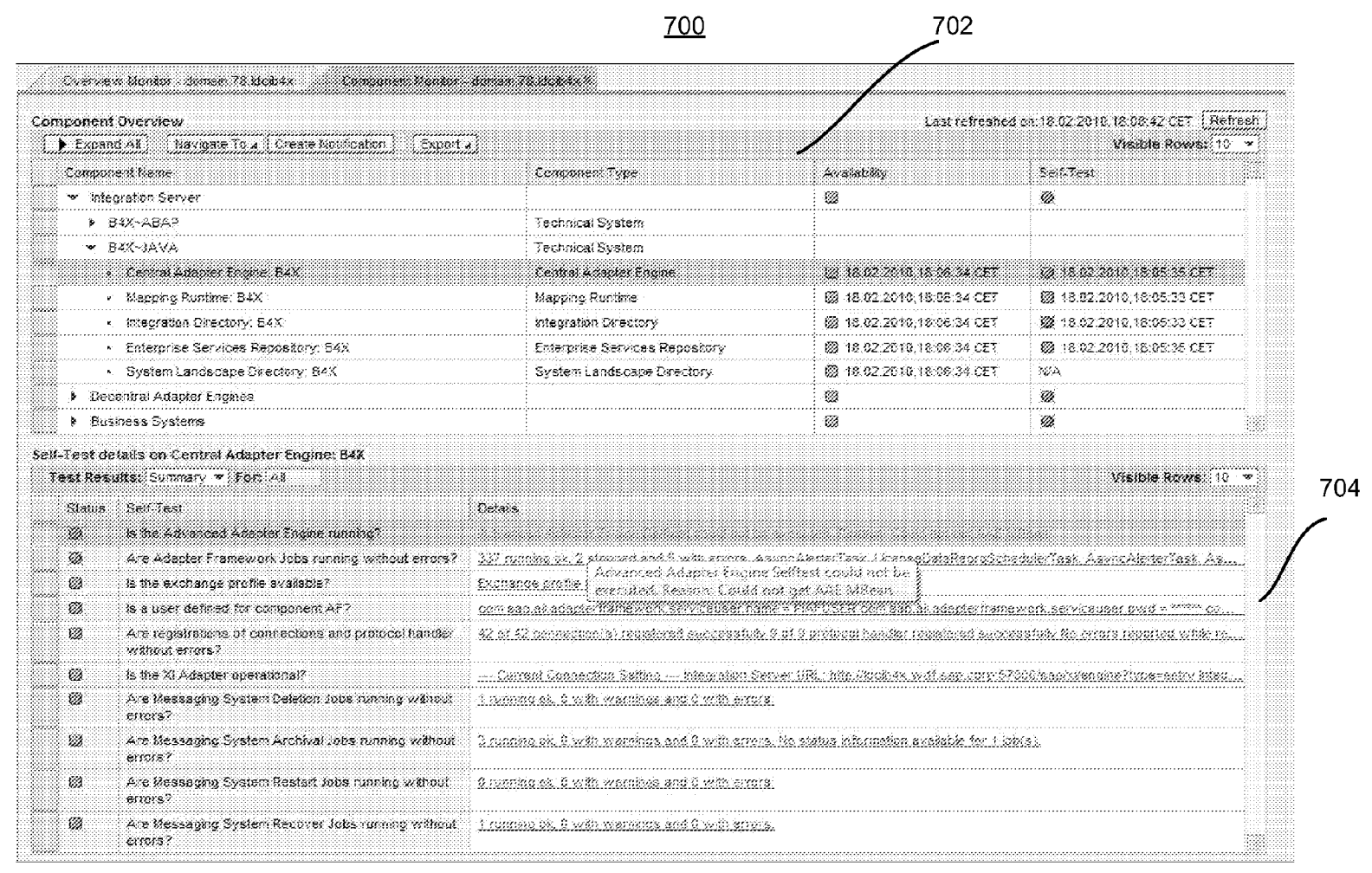

FIG. 7 illustrates an exemplary user interface 700 of a cross system monitor for a component monitor according to an exemplary embodiment. The component monitor user interface 700 may comprise a list view 702 of the components and a list view 704 of one category of detailed view of a particular component. The list view 702 may show a central view of on availability and self-test status of all PI components and the list view 704 may show details of availability or self-test for a particular PI component. For example, the list view 702 may show two self-tests for B4X-JAVA are red and need to be checked and the list view 704 may show details of self-tests of the PI component of central adapter engine B4X.

Figure 8:
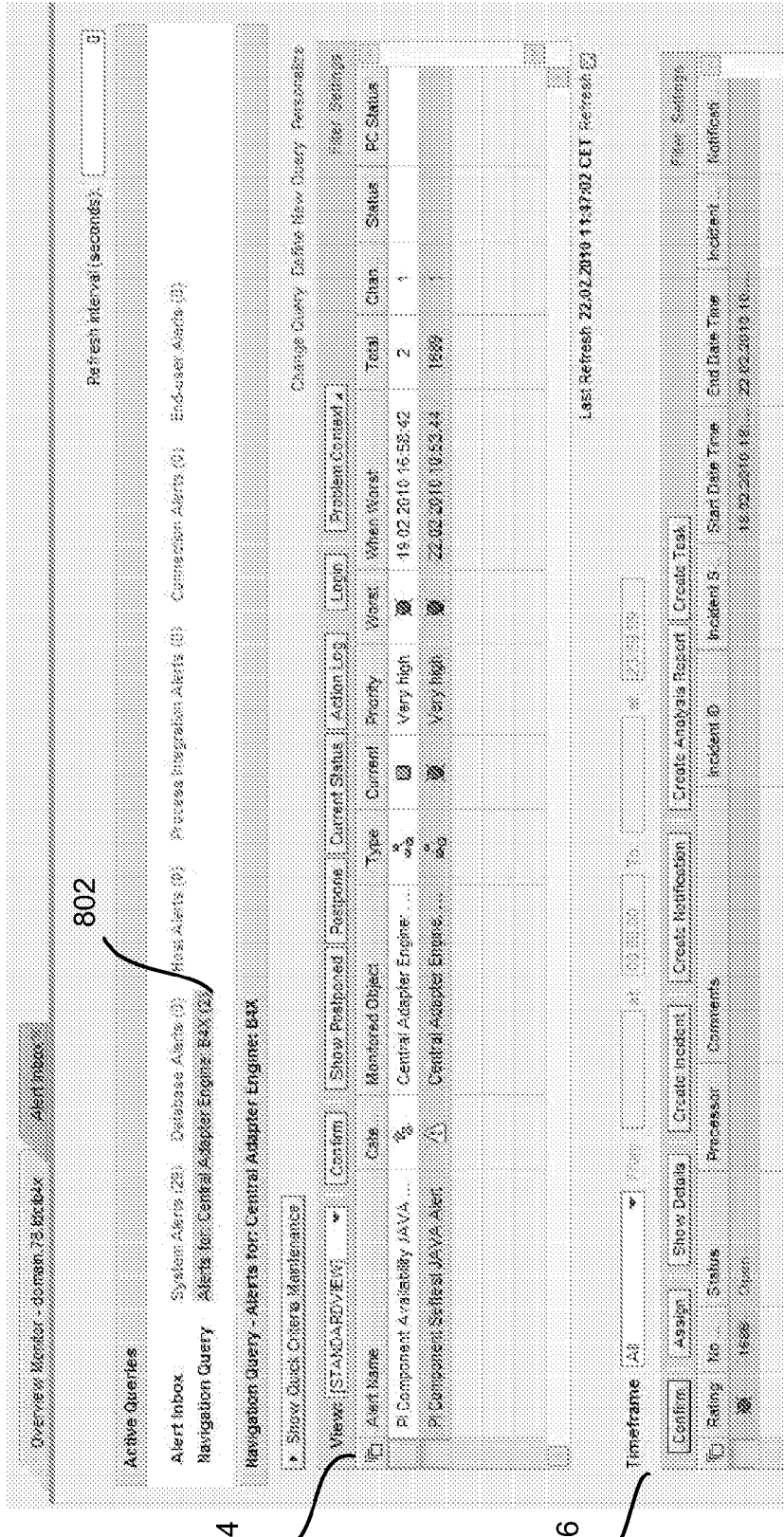
FIG. 8 illustrates an exemplary user interface of a cross system monitor for an alert inbox according to an exemplary embodiment.

FIG. 8 illustrates an exemplary user interface 800 of a cross system monitor for an alert inbox according to an exemplary embodiment. The alert inbox user interface 800 may comprise a navigation query 802, an alert type table 804 showing activities and an alert group table 806 showing activities. The navigation query 802 may be a pre-defined personal object work list (POWL) queries per category and per monitored object type. The alert type table 804 may display number of occurrences per alert type and number of status changes. In one embodiment, the alert type table 804 may be personalized for content and look-and-feel. The alert group table 806 may indicate status, processor and comments to track status of alert group directly in the alert box. Further, the alert group table 806 may also include incident ticket ID and status for incident reports.

Figure 9:
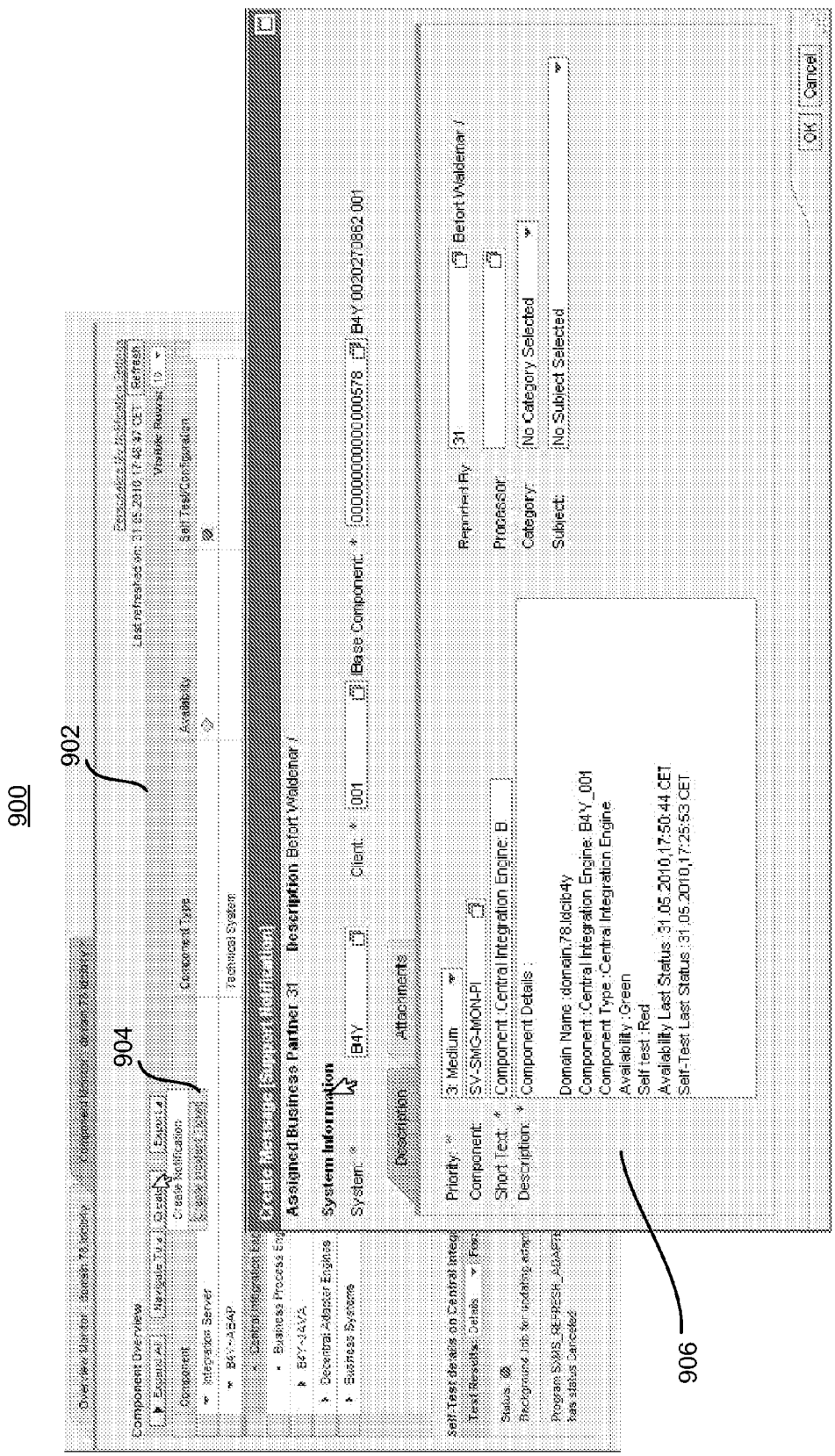
FIG. 9 illustrates an exemplary user interface of a cross system monitor for integration with incident management according to an exemplary embodiment.

FIG. 9 illustrates an exemplary user interface 900 of a cross system monitor for integration with incident management according to an exemplary embodiment. The incident management user interface 900 may comprise a component view 902, a command 904 on the component view 902 to create incident ticket, a popup window 906 to create a message for reporting an incident. The popup window 906 may comprise a plurality of fields to capture the context of the incident and the fields may be automatically filled by the cross system monitor using context information of the incident. For example, the system, component, and a short description of known conditions for the incident may be filled as shown on the popup window 906.

Figure 10:
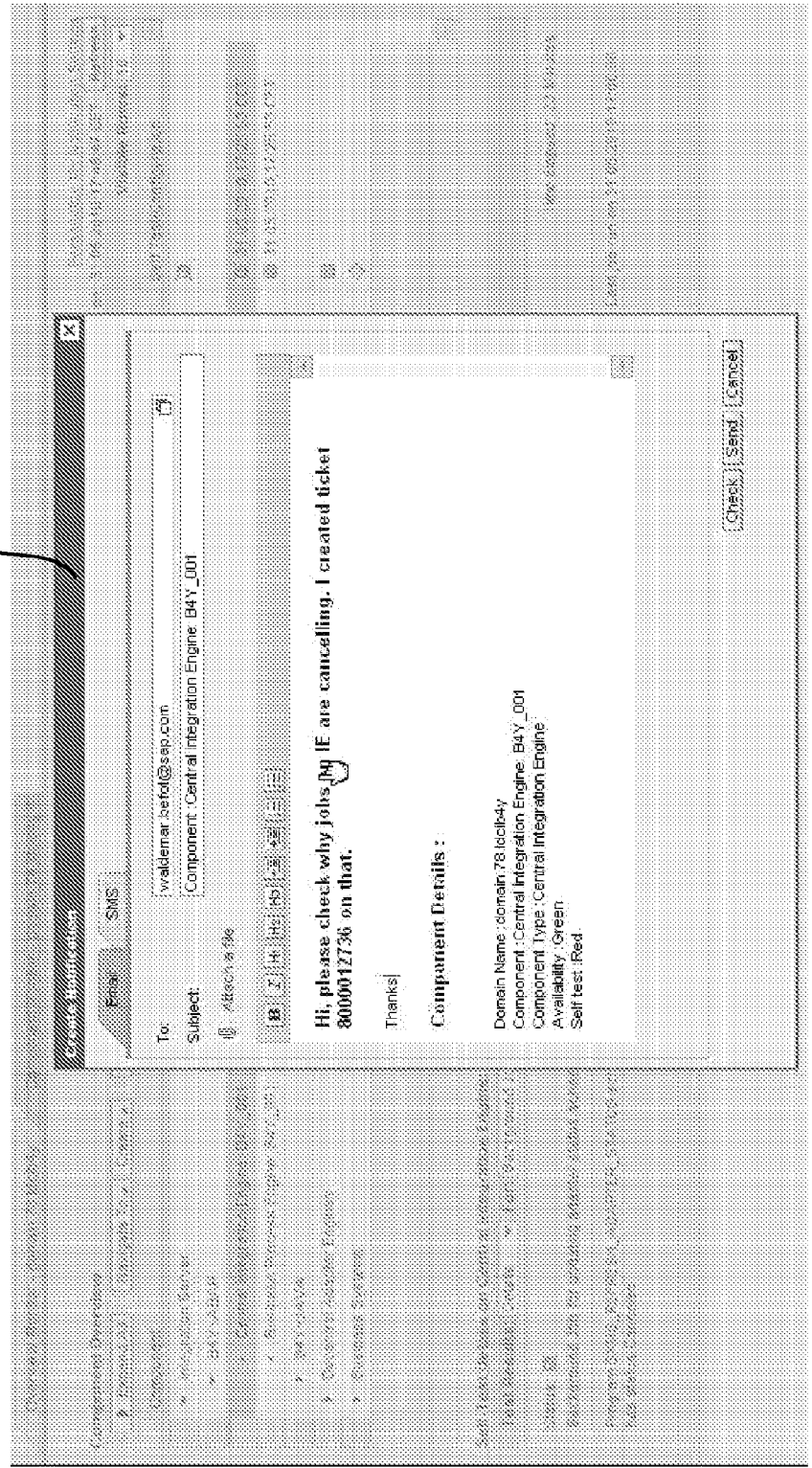
FIG. 10 illustrates an exemplary user interface of a cross system monitor for integration with notification management according to an exemplary embodiment.

FIG. 10 illustrates an exemplary user interface 1000 of a cross system monitor for integration with notification management according to an exemplary embodiment. The notification management user interface 1000 may comprise a popup window 1002 for creating a notification. The popup window 1002 may be invoked by clicking on a "create notification" command button from a component view. In the notification being created, a user may copy and past a ticket number (e.g. 8000000946). In one embodiment, all known context information may be filled automatically, such as the component details information in the notification body.

Figure 11:
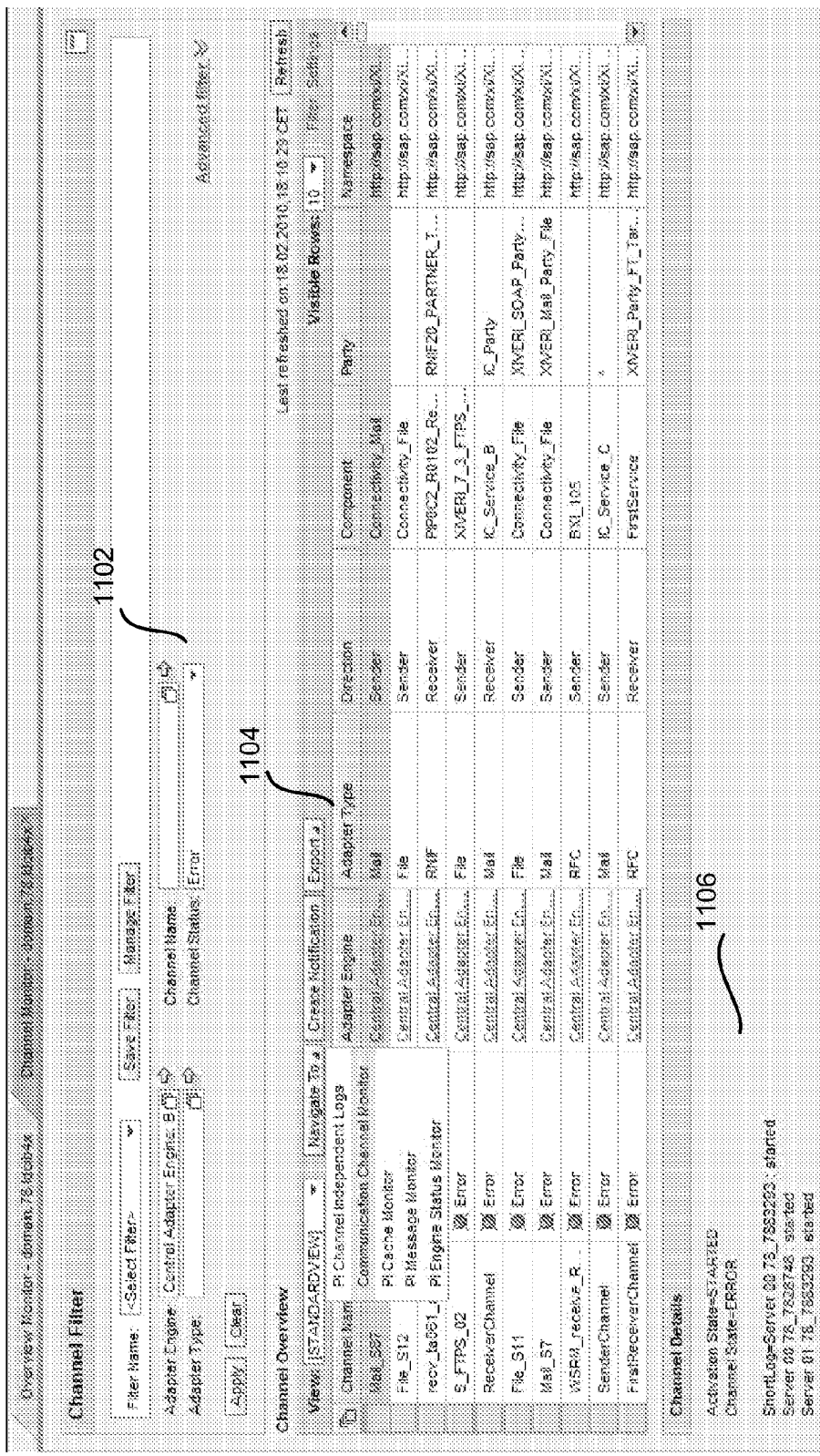
FIG. 11 illustrates an exemplary user interface of a cross system monitor for a channel monitor according to an exemplary embodiment.

FIG. 11 illustrates an exemplary user interface 1100 of a cross system monitor for a channel monitor according to an exemplary embodiment. The channel monitor user interface 1100 may include a channel filter 1102, a channel overview window 1104 and a channel detail display 1106. The channel filter 1102 may include a filter name and a plurality of parameters, for example, adapter engine, adapter type, channel name and channel status. The filter name may be an existing filter that saved with pre-configured parameters. If no filter name is specified, a specific filter may be configured by the parameters. The channel overview 1104 may display a list of channels satisfying the parameters. For example, the adapter engine parameter may determine whether the channel overview 1104 should provide a central view on availability of all channels of different adapter engines. The channel detail display 1106 may show details of a selected channel from a list of channels shown in the channel overview 1104.

The channel monitor user interface 1100 may show channels of all connected adapter engines. Many channels in error status may be found. Further investigation may be enabled by using local Channel Monitor, which may be accessed by a drop down command list. In one embodiment, the channel monitor user interface 1100 may provide follow-up actions, for example, context sensitive navigation to further monitors, start/stop/ping of channels. For example, a user responsible for file-based channels may restrict the output to file channels using an existing filter, select a channel in status ERROR, and click a button 'Manage'-'PING'. Further, the user may try to find out the root-cause by checking the details. In another example, the user may select a channel in status 'Stopped or Not-Administered' and click a button 'Manage'-'START' to start the channel. In one embodiment, the cross system monitor may provide PI Channel Independent Logs.

Figure 12:
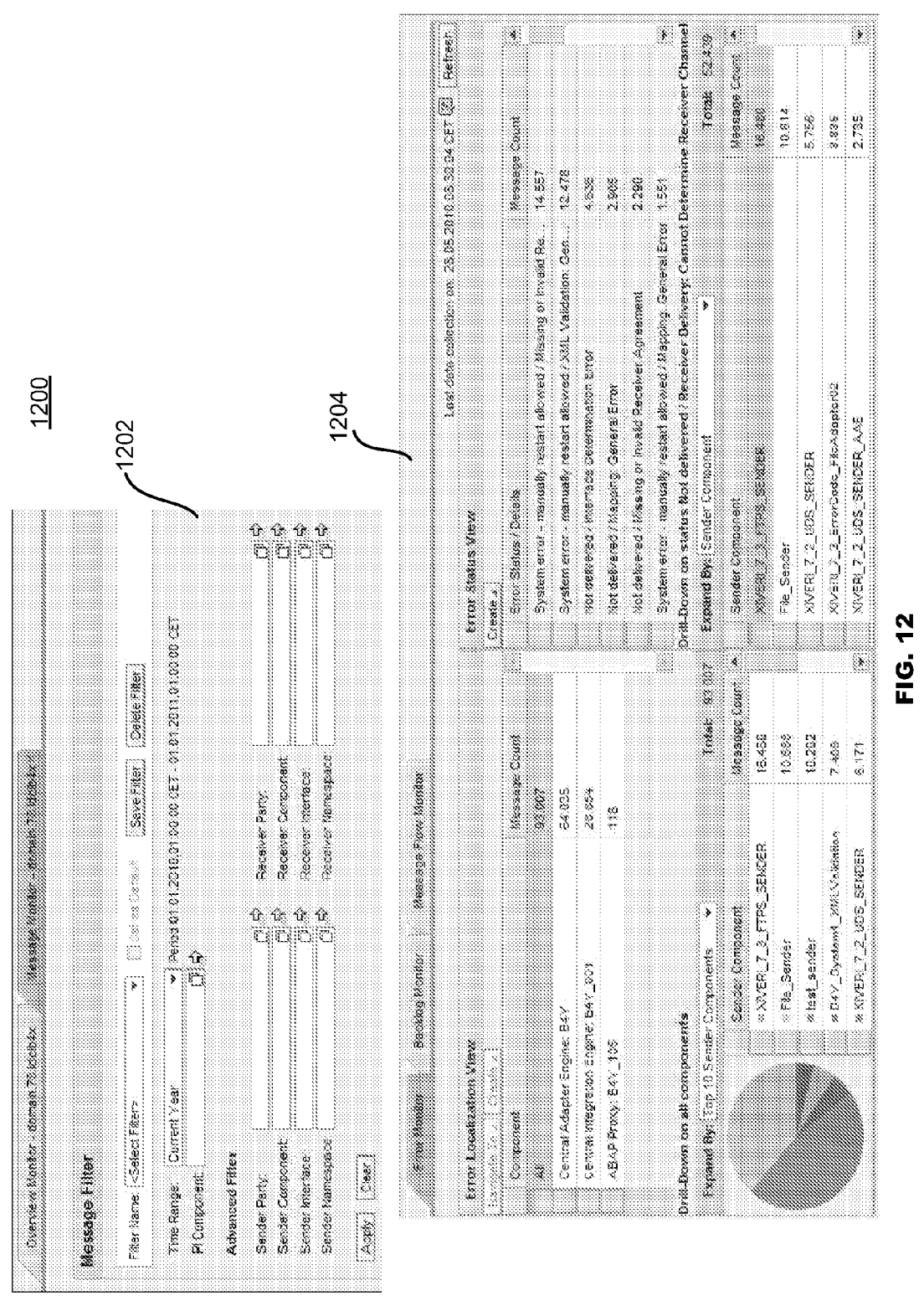

FIG. 12 illustrates an exemplary user interface 1200 of a cross system monitor for a message monitor according to an exemplary embodiment. The message monitor user interface 1200 may comprise a message filter 1202 and a plurality of monitors, such as error monitor 1204, backlog monitor (shown in FIG. 13) and message flow monitor (shown in FIG. 14). The message filter 1202 may enable a user to input a plurality of filtering parameters to create a filter for detailed filtering. The error monitor 1204 may show PI components with messages in error in an error localization view, and status of the errors in an error status view. In one embodiment, the error monitor 1204 may further provide drill down options to allow more detailed drill down on all components and/or based on status. For example, the error localization view may provide some drill-downs to find out on which components messages in error status exist and the error status view may provide some drill-downs to find out the real root-cause.

Figure 13:
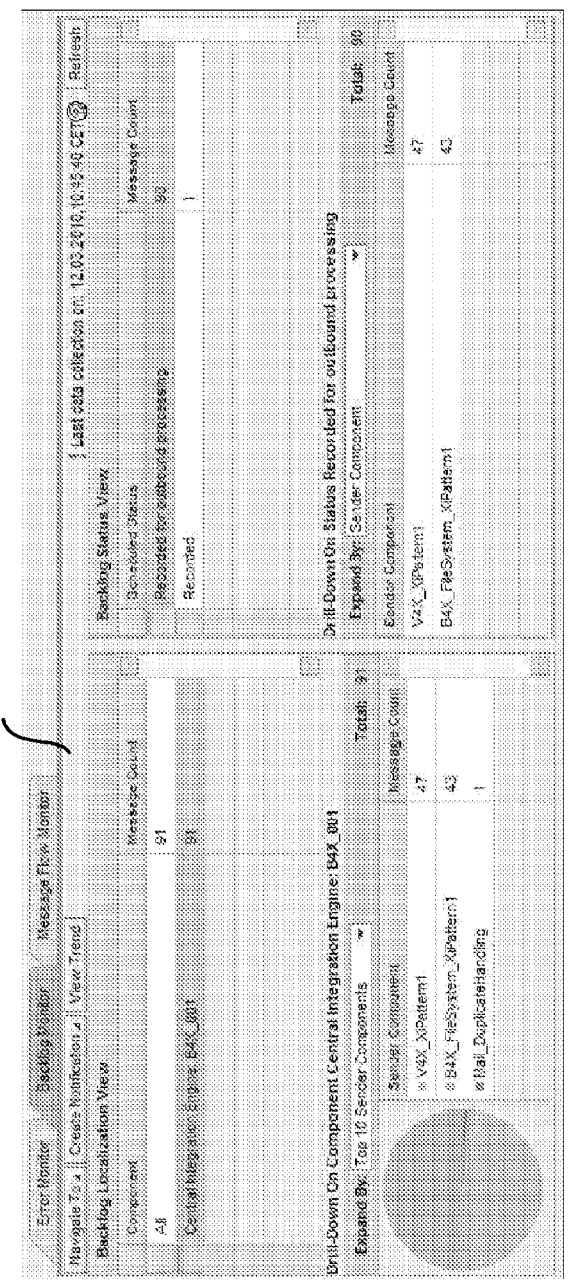
FIG. 13 illustrates an exemplary user interface of a cross system monitor for a message backlog monitor according to an exemplary embodiment.
Figure 13:
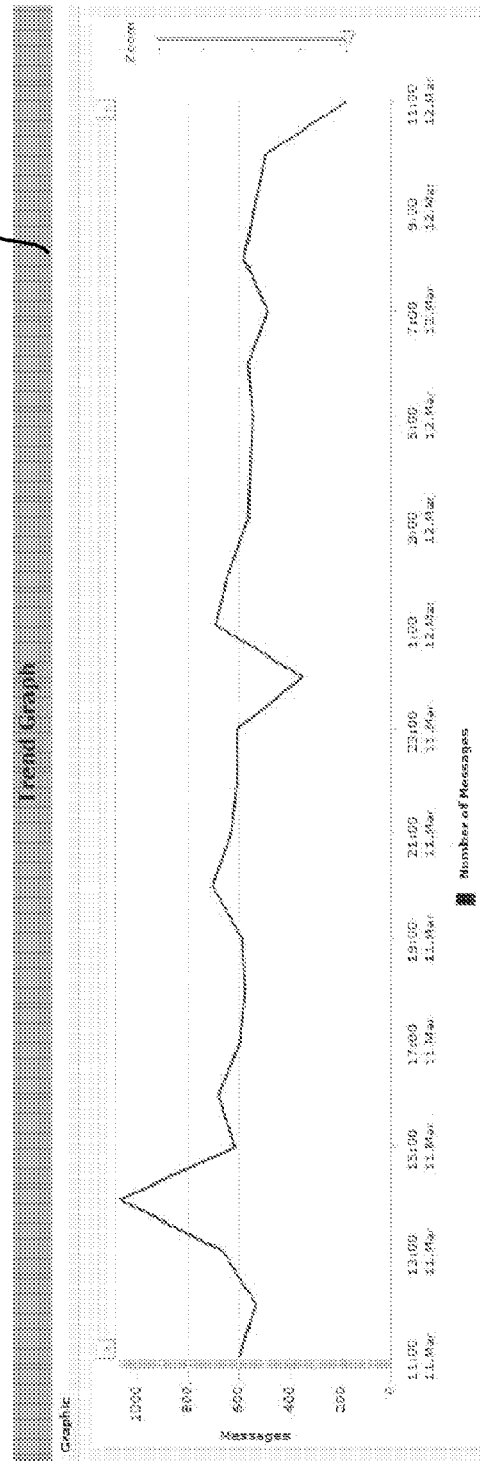

FIG. 13 illustrates an exemplary user interface 1300 of a cross system monitor for a message backlog monitor according to an exemplary embodiment. The message backlog monitor user interface 1300 a backlog monitor 1302 and a trend graph 1304. The message backlog monitor 1302 may show PI components with message backlogs in a backlog localization view, and status of the message backlogs in a backlog status view. In one embodiment, the message backlog monitor 1302 may further provide drill down options to allow more detailed drill down on all components and/or based on status. For example, the backlog localization view may provide some drill-downs to find out on how many backlogged messages each component has and the backlog status view may provide some drill-downs on based on status.

The trend graph 1304 may display a historical view and help to detect a trend for the backlogs.

Figure 14:
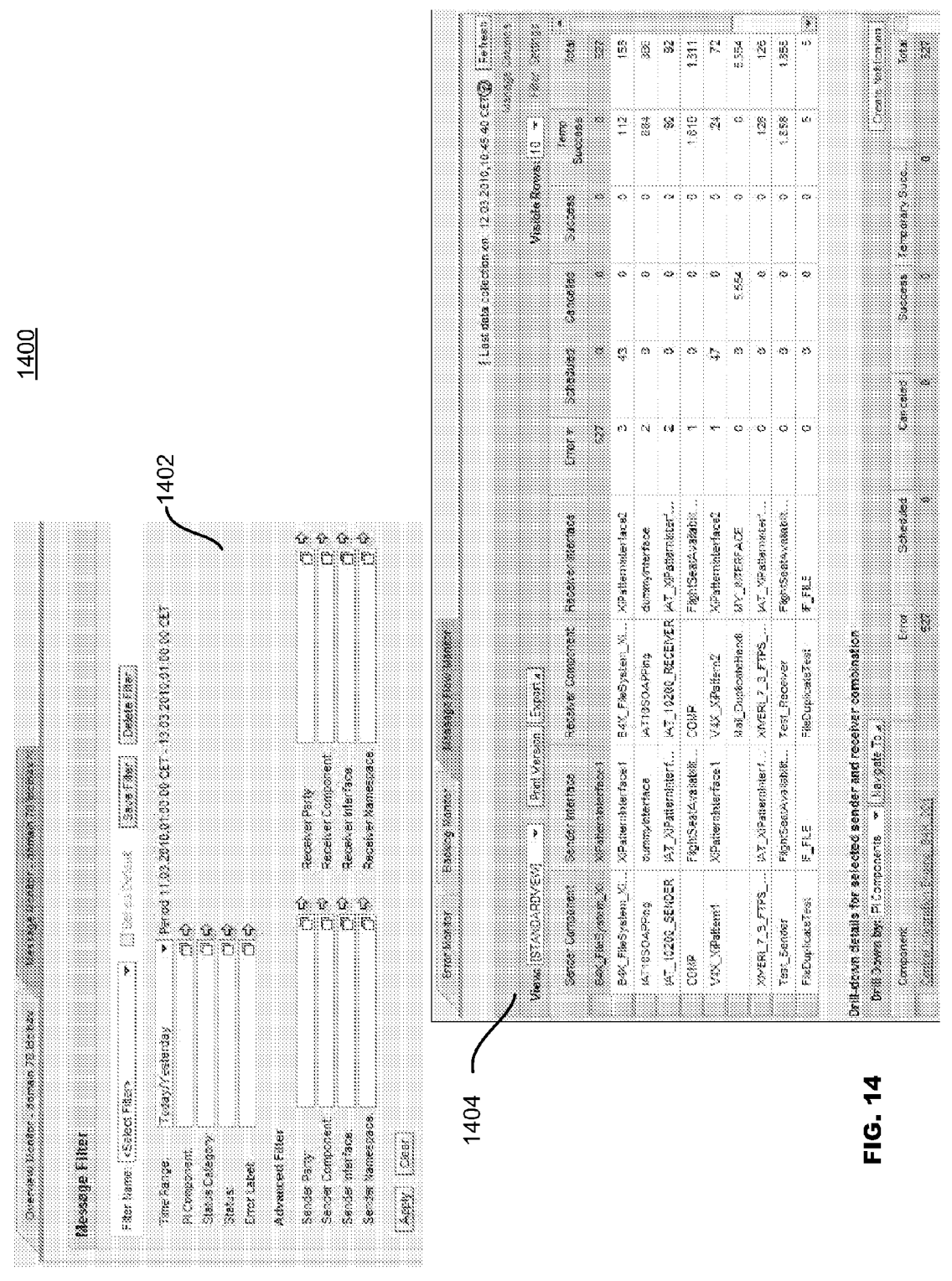

FIG. 14 illustrates an exemplary user interface 1400 of a cross system monitor for a message flow monitor according to an exemplary embodiment. The message flow monitor may be navigated to by clicking on any number of messages. The message flow monitor user interface 1400 may comprise a message filter 1402 and a message flow monitor 1404. The message filter 1402 may be identical to the message filter 1202. The message flow monitor 1404 may offer a component independent view on the message processing and may provide some drill-downs details for selected sender and receiver combination.

The message monitor may provide a convenient tool for diagnose and fix problems in communications. For example, a user of the PI domain may report missing messages of a certain sender interface. An administrator may remove all columns in a message flow monitor except "sender interface," enter the interface name and check on which PI components those messages failed. The administrator may restart/cancel messages via a context sensitive popup button 'Manage."

In one embodiment, the message monitor provide context-sensitive navigation to the local message monitors using a button "Navigate To" and select "Message Monitor." The message monitor may be integrated with notification and incident management, and may report on message throughput cross the PI components.

The cross system monitor according an exemplary embodiment may be highly integrated with system monitoring. It may help identify issues of underlying technical system for a running PI component. As described above, the cross system monitor may be also highly integrated with the incident management functionality, which allows to create support tickets in the context of an analysis and necessary data may be passed automatically. The cross system monitor may be highly integrated with the notification management functionality that allows to create notifications (via email or SMS) in the context of an analysis and necessary data may be passed automatically. Further, a user may be guided after an error detection by offering a suitable set of navigation links according the analysis context (e.g., depending on the PI component, technical system). In one embodiment, incidents may automatically result in alerts that may be forwarded via email or SMS.

The exemplary method and computer program instructions may be embodied on a machine readable storage medium such as a computer disc, optically-readable media, magnetic media, hard drives, RAID storage device, and flash memory. In addition, a server or database server may include machine readable media configured to store machine executable program instructions. The features of the embodiments of the present invention may be implemented in hardware, software, firmware, or a combination thereof and utilized in systems, subsystems, components or subcomponents thereof. When implemented in software, the elements of the invention are programs or the code segments used to perform the necessary tasks. The program or code segments can be stored on machine readable storage media. The "machine readable storage media" may include any medium that can store information. Examples of a machine readable storage medium include electronic circuits, semiconductor memory device, ROM, flash memory, erasable ROM (EROM), floppy diskette, CD-ROM, optical disk, hard disk, fiber optic medium, or any electromagnetic or optical storage device. The code segments may be downloaded via computer networks such as Internet, Intranet, etc.

Although the invention has been described above with reference to specific embodiments, the invention is not limited to the above embodiments and the specific configurations shown in the drawings. For example, some components shown may be combined with each other as one embodiment, or a component may be divided into several subcomponents, or any other known or available component may be added. The operation processes are also not limited to those shown in the examples. Those skilled in the art will appreciate that the invention may be implemented in other ways without departing from the sprit and substantive features of the invention. For example, features and embodiments described above may be combined with and without each other. The present embodiments are therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. An apparatus for cross process integration (PI) component monitoring, comprising:
    a memory to store computer program instructions; and
    a processor coupled to the memory to execute the computer program instructions to:
    provide a central dashboard for PI domain being connected to a plurality of PI components of the PI domain, the central dashboard to receive diagnostic data pushed by diagnostic agents running on the plurality of PI components and message flow data pulled from the plurality of PI components;
    integrate the central dashboard to system monitoring by collecting performance related metrics data;
    integrate the central dashboard to incident management by providing a context sensitive support ticket creation, the context sensitive support ticket creation automatically copying data to a ticket being created;
    integrate the central dashboard to notification management by providing a context sensitive notification message creation, the context sensitive notification creation automatically copying data to a notification message being created;
    provide a set of navigation links on the central dashboard according to an analysis context, wherein the analysis context includes the PI components and their respective underlying technical systems, the set of navigation links include at least one link from the central dashboard to show a system hierarchy of a respective underlying technical system, the system hierarchy comprises a top level showing the respective technical underlying system, a middle level showing server nodes and a bottom level showing technical boxes, and the set of navigation links include at least one link from the central dashboard to show elements of the respective underlying technical system's runtime stack;
    forward an alert automatically when an incident occurs;
    wherein the central dashboard displays the collected message flow data in a message monitor; and
    wherein the message monitor provides a message filter and a message error monitor, a message backlog monitor and a message flow monitor.

2. The apparatus of claim 1, wherein the notification message is an email or a Short Message Service (SMS) message.

3. The apparatus of claim 1, wherein the PI components communicate by a message based interaction.

4. A non-transitory computer-readable storage medium embodied with program instructions for causing a computer to execute a method for cross process integration (PI) component monitoring, the method comprising:
    providing a central dashboard for PI domain being connected to a plurality of PI components of the PI domain, the central dashboard to receive diagnostic data pushed by diagnostic agents running on the plurality of PI components and message flow data pulled from the plurality of PI components;
    integrating the central dashboard to system monitoring by collecting performance related metrics data;
    integrating the central dashboard to incident management by providing a context sensitive support ticket creation, the context sensitive support ticket creation automatically copying data to a ticket being created;
    integrating the central dashboard to notification management by providing a context sensitive notification message creation, the context sensitive notification creation automatically copying data to a notification message being created;
    providing a set of navigation links on the central dashboard according to an analysis context, wherein the analysis context includes the PI components and their respective underlying technical systems, the set of navigation links include at least one link from the central dashboard to show a system hierarchy of a respective underlying technical system, the system hierarchy comprises a top level showing the respective technical underlying system, a middle level showing server nodes and a bottom level showing technical boxes, and the set of navigation links include at least one link from the central dashboard to show elements of the respective underlying technical system's runtime stack;
    forwarding an alert automatically when an incident occurs;
    wherein the central dashboard displays the collected message flow data in a message monitor; and
    wherein the message monitor provides a message filter and a message error monitor, a message backlog monitor and a message flow monitor.

5. The non-transitory computer-readable storage medium of claim 4, wherein the notification message is an email or a Short Message Service (SMS) message.

6. The non-transitory computer-readable storage medium of claim 4, wherein the PI components communicates by a message based interaction.

7. A computer implemented method, the method comprising:
    providing, by a computer processor, a central dashboard for a process integration (PI) domain being connected to a plurality of PI components of the PI domain, the central dashboard to receive diagnostic data pushed by diagnostic agents running on the plurality of PI components and message flow data pulled from the plurality of PI components;
    integrating, by the computer processor, the central dashboard to system monitoring by collecting performance related metrics data;
    integrating, by the computer processor, the central dashboard to incident management by providing a context sensitive support ticket creation, the context sensitive support ticket creation automatically copying data to a ticket being created;
    integrating, by the computer processor, the central dashboard to notification management by providing a context sensitive notification message creation, the context sensitive notification creation automatically copying data to a notification message being created;

providing, by the computer processor, a set of navigation links on the central dashboard according to an analysis context, wherein the analysis context includes the PI components and their respective underlying technical systems, the set of navigation links include at least one link from the central dashboard to show a system hierarchy of a respective underlying technical system, the system hierarchy comprises a top level showing the respective technical underlying system, a middle level showing server nodes and a bottom level showing technical boxes, and the set of navigation links include at least one link from the central dashboard to show elements of the respective underlying technical system's runtime stack; and forwarding, by the computer processor, an alert automatically when an incident occurs;

wherein the central dashboard displays the collected message flow data in a message monitor; and wherein the message monitor provides a message filter and a message error monitor, a message backlog monitor and a message flow monitor.

8. The computer implemented method of claim 7, wherein the notification message is an email or a Short Message Service (SMS) message.

9. The computer implemented method of claim 7, wherein the PI components communicates by a message based interaction.

* * * * *